(12) United States Patent
Yanagisawa et al.

(10) Patent No.: US 7,014,829 B2
(45) Date of Patent: Mar. 21, 2006

(54) CARBON FIBER, AND FILTER AND ABSORBENT USING THE SAME

(75) Inventors: Takashi Yanagisawa, Tokyo (JP); Shunji Higaki, Nagareyama (JP)

(73) Assignee: GSi Creos Corporation, Tokyo (JP)

( * ) Notice: Subject to any disclaimer, the term of this patent is extended or adjusted under 35 U.S.C. 154(b) by 0 days.

(21) Appl. No.: 10/098,312

(22) Filed: Mar. 18, 2002

(65) Prior Publication Data

US 2003/0044615 A1 Mar. 6, 2003

(30) Foreign Application Priority Data

Aug. 29, 2001 (JP) .............................. 2001-260492

(51) Int. Cl.
*D01F 9/12* (2006.01)
(52) U.S. Cl. .............................. 423/447.1; 423/447.2; 423/447.3; 428/367; 977/DIG. 1
(58) Field of Classification Search ............. 423/447.1, 423/447.2, 447.3, 445 R; 428/367
See application file for complete search history.

(56) References Cited

U.S. PATENT DOCUMENTS

| 5,626,650 A | 5/1997 | Rodriguez et al. |
| 5,780,101 A * | 7/1998 | Nolan et al. ................ 427/216 |
| 2003/0004058 A1 * | 1/2003 | Li et al. ..................... 502/258 |

FOREIGN PATENT DOCUMENTS

| EP | 0 198 558 A2 | 10/1986 |
| EP | 1 122 344 A2 | 8/2001 |

OTHER PUBLICATIONS

Endo et al., "Structural characterization of cup-stacked nanofibres with an entirely hollow core," Applied Physics Letters, vol. 80, No. 7, Feb. 18, 2002, pp. 1267-1269. (Filed with IDS submitted on Jul. 8, 2002).
Terrones et al., "Graphitic cones in palladium catalysed carbon nanofibres," Chemical Physics Letters, vol. 343, Aug. 3, 2001, pp. 241-250.
Endo et al., "Pyrolytic Carbon Nanotubes from Vapor-Grown Carbon Fibers," Carbon, Elsevier Science Publishing, New York, NY, vol. 33, No. 7, 1995, pp. 873-881.
Endo et al., "Structural characterization of cup-stacked-type nanofibers with an entirely hollow core", Applied Physics Letters, vol. 80, No. 7, Feb. 18, 2002, pp. 1267-1269.
Kim et al., "Effect of ball milling on morphology of cup-stacked carbon nanotubes", Chemical Physics Letters, Apr. 2, 2002.
U.S. Appl. No. 10/098,375, filed Mar. 18, 2002, Yanagisawa et al.
U.S. Appl. No. 10/098,416, filed Mar. 18, 2002, Yanagisawa et al.

(Continued)

*Primary Examiner*—Stanley S. Silverman
*Assistant Examiner*—Peter J. Lish
(74) *Attorney, Agent, or Firm*—Oliff & Berridge, PLC

(57) ABSTRACT

A carbon fiber in which hexagonal carbon layers in the shape of a bottomless cup are stacked. At least part of edges of the hexagonal carbon layers are exposed on an outer surface and an inner surface of the carbon fiber. The exposed large ring end has an armchair edge, a zigzag edge, and a chiral edge on the circumference. This carbon fiber has a high degree of activity on the exposed edges of the hexagonal carbon layers and the surfaces of the carbon fiber. Therefore, the carbon fiber can be used as various types of filters and the like.

10 Claims, 25 Drawing Sheets

OTHER PUBLICATIONS

U.S. Appl. No. 10/098,351, filed Mar. 18, 2002, Yanagisawa et al.
U.S. Appl. No. 10/098,396, filed Mar. 18, 2002, Yanagisawa et al.
U.S. Appl. No. 10/098,461, filed Mar. 18, 2002, Yanagisawa et al.
U.S. Appl. No. 10/098,440, filed Mar. 18, 2002, Yanagisawa et al.
U.S. Appl. No. 10/098,103, filed Mar. 18, 2002, Yanagisawa et al.
U.S. Appl. No. 10/098,522, filed Mar. 18, 2002, Yanagisawa et al.
U.S. Appl. No. 10/098,379, filed Mar. 18, 2002, Yanagisawa et al.
U.S. Appl. No. 10/098,570, filed Mar. 18, 2002, Yanagisawa et al.

R.T.K. Baker & P.S. Harris, *The Formation of Filamentous Carbon*, in Chemistry and Physics of Carbon 83-165 (P.L. Walker & P.A. Thrower eds., Marcel Dekker 1978).
E. Boellaard et al., *The Formation of Filamentous Carbon on Iron and Nickel Catalysts: III, Morphology*, 96 J. Catal. 481 (1985).
I. Alstrup, *A New Model Explaining Carbon Filament Growth on Nickel, Iron, and Ni-Cu Alloy Catalysts*, 109 J. Catal. 241 (1988).
R.T. Tang & J.P. Chen, *Mechanism of Carbon Filament Growth on Metal Catalysts*, 115 J. Catal. 52 (1989).
E. Tracz et al., *High-Resolution Electron Microscopy Study of the Carbon Deposit Morphology on Nickel Catalysts*, 66 Applied Catalysis 133 (1990).
N.M. Rodriguez, *A Review of Catalytically Grown Carbon Nanofibers*, 8 J. Mater. Res.3233 (1993).

* cited by examiner 12  10

Tube (*n,n*)
Armchair type

Tube (*n,0*)
Zigzag type

Tube (*n,m*)
Chiral type

CARBON FIBER, AND FILTER AND ABSORBENT USING THE SAME

Japanese Patent Application No. 2001-260492, filed on Aug. 29, 2001, is herein incorporated by reference in its entirety.

BACKGROUND OF THE INVENTION

The present invention relates to a carbon fiber, and a filter and an absorbent using the same.

A vapor grown carbon fiber is known in the art.

This carbon fiber is a short fiber in which carbon obtained by pyrolysis of hydrocarbons such as benzene or methane at a temperature of about 700 to 1000° C. is grown with a catalyst particle such as a ultra-fine iron particle or nickel as a nucleus.

Carbon fibers generally have a structure in which the hexagonal carbon layers are grown concentrically or a structure in which the hexagonal carbon layers are grown vertically to the fiber axis. However, depending upon the vapor growth conditions such as catalyst, temperature range, and flow rate, carbon fibers may have a herring-bone structure in which the stacked hexagonal carbon layers are tilted with respect to the fiber axis at a specific angle.

Carbon fibers are often mixed with resins or the like and used as composites. However, carbon fibers generally have poor adhesion to resins.

This is because carbon fibers have a lower degree of surface activity since the hexagonal carbon layers (AB planes) are exposed on the inner and outer surfaces. Moreover, a thin deposited layer in which an excess amount of insufficiently crystallized amorphous carbon is deposited is inevitably formed on the surface of carbon fibers manufactured using a vapor growth process. This deposited layer also has a lower degree of activity, thereby resulting in poor adhesion to the resins.

BRIEF SUMMARY OF THE INVENTION

The present invention has been achieved to solve the above-described problems. An object of the present invention is to provide a carbon fiber having highly active edges, and a filter and an absorbent using the same.

According to a first aspect of the present invention, there is provided a carbon fiber comprising a coaxial stacking morphology of truncated conical tubular graphene layers, wherein each of the truncated conical tubular graphene layers includes a hexagonal carbon layer.

In other words, this carbon fiber has a cup-stacked structure or a lampshade-stacked structure in which a number of hexagonal carbon layers in the shape of a bottomless cup are stacked. The coaxial stacking morphology of the truncated conical tubular graphene layers may have a shape of a hollow core with no bridge. According to such a structure, each of the truncated conical tubular graphene layers has a large ring end at one end and a small ring end at the other end in an axial direction, wherein edges of the hexagonal carbon layers are exposed at the large ring ends of the outer surface and the small ring ends of the inner surface. In other words, the edges of the tilted hexagonal carbon layers having a herring-bone structure are exposed in layers.

If the coaxial stacking morphology of the truncated conical tubular graphene layers is vapor grown, a wide area of an outer surface or an inner surface may be covered with a deposited film of an excess amount of pyrolytic carbons. However, at least part of edges of the hexagonal carbon layers may be exposed at the large ring ends on the outer surface side or at the small ring ends on the inner surface side.

The edges of the hexagonal carbon layers exposed on the outer surface or the inner surface of the carbon fiber have an extremely high degree of activity, exhibit good affinity to various types of materials, and excel in adhesion to base materials such as resins. Therefore, a composite excelling in tensile strength and compressive strength can be obtained.

In this carbon fiber, part or all of the deposited films formed over the outer surface or the inner surface during the vapor growth process of the carbon fiber may be removed by a treatment to be performed later. It is because the deposited layers are formed of an excess amount of insufficiently crystallized amorphous carbon, and the surfaces of the deposited layers are inactive.

In this carbon fiber, an outer surface of the carbon fiber may be formed of the large ring ends stacked in the axial direction; and exposed part of the edges of the hexagonal carbon layers may have an area equal to or more than 2% of an area of the outer surface, and preferably 7% of an area of the outer surface.

The positions of the large ring ends forming the outer surface may be irregular, and the outer surface may have minute irregularity at the level of atoms.

Similarly, an inner surface of the carbon fiber may be formed of the small ring ends stacked in the axial direction; and positions of the small ring ends forming the inner surface may be irregular, and the inner surface may have minute irregularity at the level of atoms.

The exposed large or small ring end may have an armchair edge, a zigzag edge, and a chiral edge on the circumference.

Such an irregular structure in which these edges are exposed increases the degree of activity of the edges.

Since the carbon fiber in which one to several hundreds of bottomless cup-shaped hexagonal carbon layers are stacked is in the shape of a minute particle, the carbon fiber has good dispersibility in resins or metals. As a result, various types of composites excelling in strength and ink exhibiting good coloring characteristics can be provided.

The carbon fiber according to the first aspect of the present invention may have characteristics by which at least an area in which the edges of the hexagonal carbon layers are exposed (or an area in which the deposited layers are removed) is not graphitized even if the carbon fiber is subjected to a heat treatment at a temperature of 2500° C. or more.

Carbon fibers are generally graphitized by a heat treatment at a temperature of 2500° C. or more.

However, the carbon fiber in which the edges of the hexagonal carbon layers are exposed is not graphitized even if the carbon fiber is heated at 2500° C. or more at least in the area in which the edges of the hexagonal carbon layers are exposed.

It is confirmed that the carbon fiber is not graphitized by a heat treatment at a temperature of 2500° C. or more by the fact that the D peak (1360 cm$^{-1}$) in the Raman spectrum does not disappear.

According to a second aspect of the present invention, there is provided a filter and an absorbent having the above described carbon fiber. Since this carbon fiber has characteristics which differs between the large ring ends and the small ring ends, the carbon fiber can be used as various types of filters, absorbents, and the like.

DETAILED DESCRIPTION OF THE EMBODIMENT

Some embodiments of the present invention will be described below in detail with reference to the drawings.

Carbon fibers generally have a structure in which the hexagonal carbon layers are grown concentrically or a structure in which the hexagonal carbon layers are grown in the axial direction. However, depending upon the vapor growth conditions such as catalyst, temperature range, and flow rate, carbon fibers may have a herring-bone structure in which the stacked hexagonal carbon layers are tilted with respect to the fiber axis at a specific angle.

In an ordinary carbon fibers with a herring-bone structure, a number of hexagonal carbon layers in the shape of a cup having a bottom are stacked. However, the vapor-grown carbon fiber according to one embodiment of the present invention has a structure in which a number of hexagonal carbon layers in the shape of a bottomless cup are stacked (this bottomless carbon fiber is hereinafter called "carbon fiber having a herring-bone structure").

Figures 23, 24:
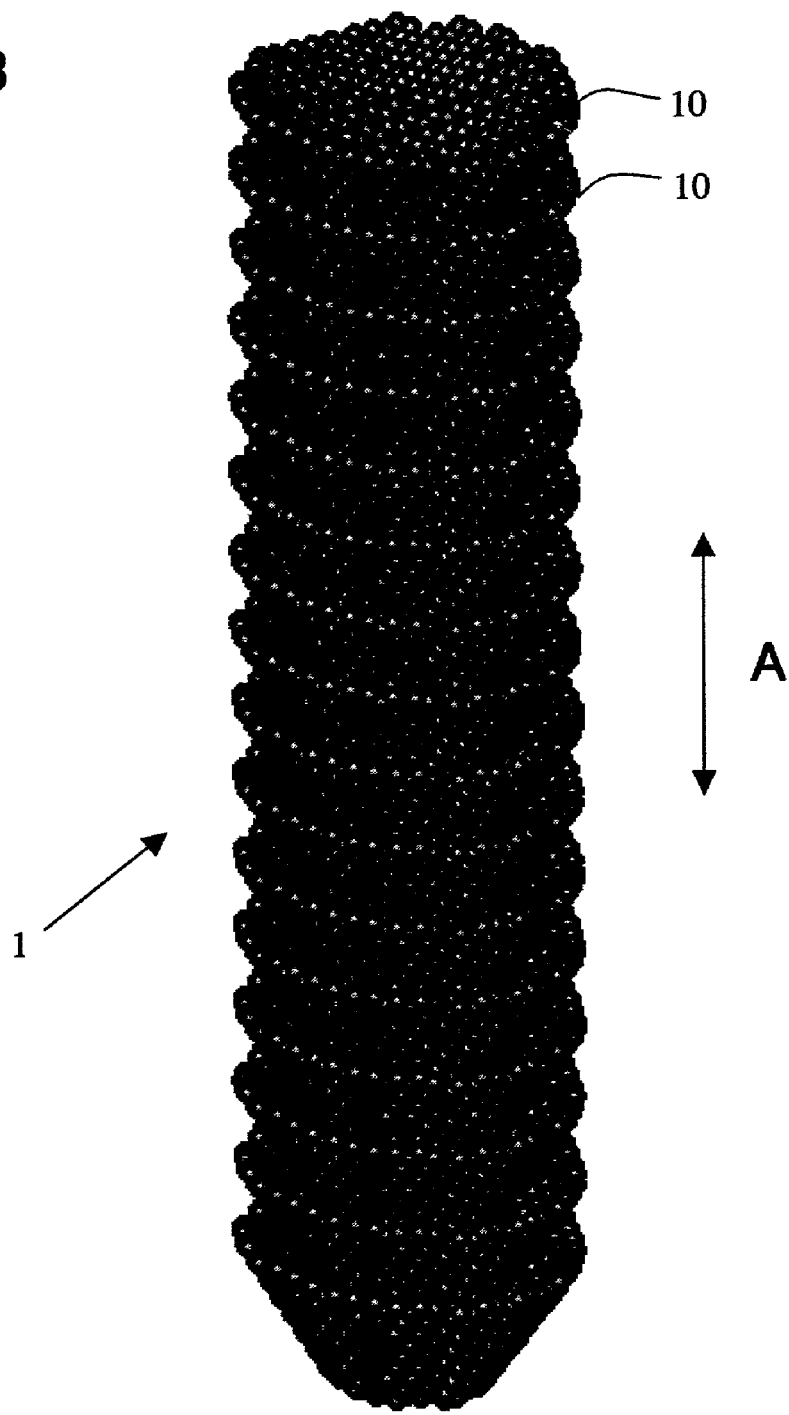
FIG. 23 is another computer graphic of a coaxial stacking morphology of truncated conical tubular graphene layers based on rigorous quantum theoretical calculation.
FIG. 24 is a computer graphic of a hexagonal carbon layer, which is a unit of the coaxial stacking morphology of the truncated conical tubular graphene layers shown in FIG. 23, based on rigorous quantum theoretical calculation.

Specifically, this carbon fiber has a coaxial stacking morphology of truncated conical tubular graphene layers shown by computer graphics in FIG. 23. Each of the truncated conical tubular graphene layers is formed of a hexagonal carbon layer 10 shown in FIG. 24. Although the actual hexagonal carbon layers are stacked densely in an axial direction A, they are stacked roughly in FIG. 23 for convenience of description.

Figure 25:
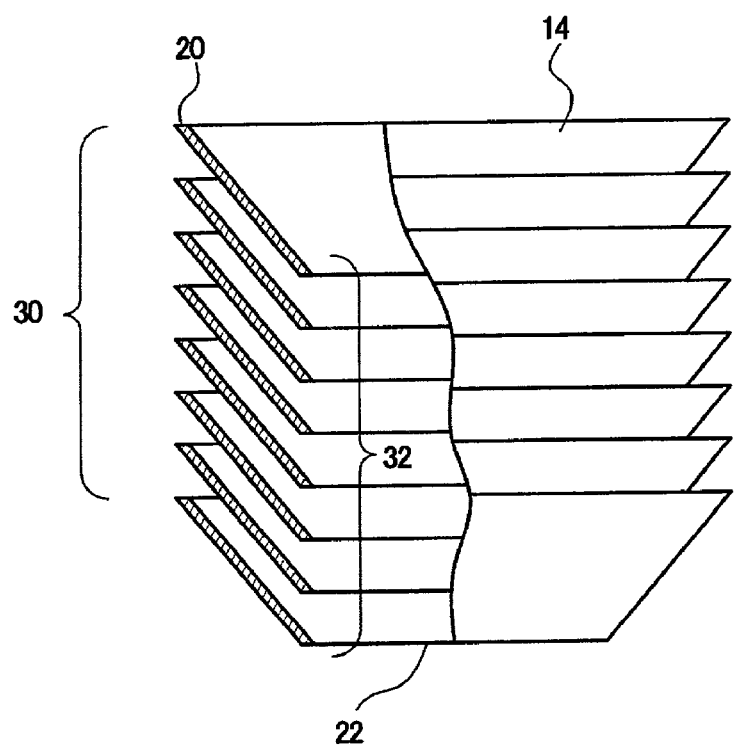
FIG. 25 is a schematic view for showing large ring ends and small ring ends which respectively form an outer surface and an inner surface of the coaxial stacking morphology of truncated conical tubular graphene layers.

FIG. 25 is a schematic view of FIG. 23. Each of the hexagonal carbon layers 10 has a large ring end 20 and a small ring end 22 at opposite ends in the axial direction. The large ring ends 20 are stacked in the axial direction A to form an outer surface 30 of the carbon fiber 1. The small ring ends 22 are stacked in the axial direction A to form an inner surface 32 of the carbon fiber 1. The carbon fiber 1 is thus in the shape of a hollow core with no bridge and has a center hole 14.

An example of a method of manufacturing the carbon fiber 1 shown in FIG. 23 is described below.

A conventional vertical type reactor was used.

Benzene as a raw material was fed to a chamber of the reactor using a hydrogen stream at a flow rate of 0.3 1/h and a partial pressure equivalent to the vapor pressure at about 20° C. Ferrocene as a catalyst was vaporized at 185° C. and fed to the chamber at a concentration of about $3 \times 10^{-7}$ mol/s. The reaction temperature and the reaction time were about 1100° C. and about 20 minutes, respectively. As a result, a carbon fiber having a herring-bone structure with an average diameter of about 100 nm was obtained. A hollow carbon fiber having no bridge at a length ranging from several tens of nanometers to several tens of microns, in which a number of hexagonal carbon layers in the shape of a bottomless cup are stacked, is obtained by adjusting the flow rate of the raw material and the reaction temperature (which are changed depending on the size of the reactor).

In this embodiment, the length of the carbon fiber in which a number of hexagonal carbon layers in the shape of a bottomless cup are stacked is adjusted by grinding so that one to several hundreds of hexagonal carbon layers in the shape of a bottomless cup are stacked, as described later. The carbon fiber may be adjusted to a carbon fiber with a desired length in which several thousands to several ten thousands of hexagonal carbon layers are stacked.

Characteristics of the carbon fiber are described below.

Figure 1:
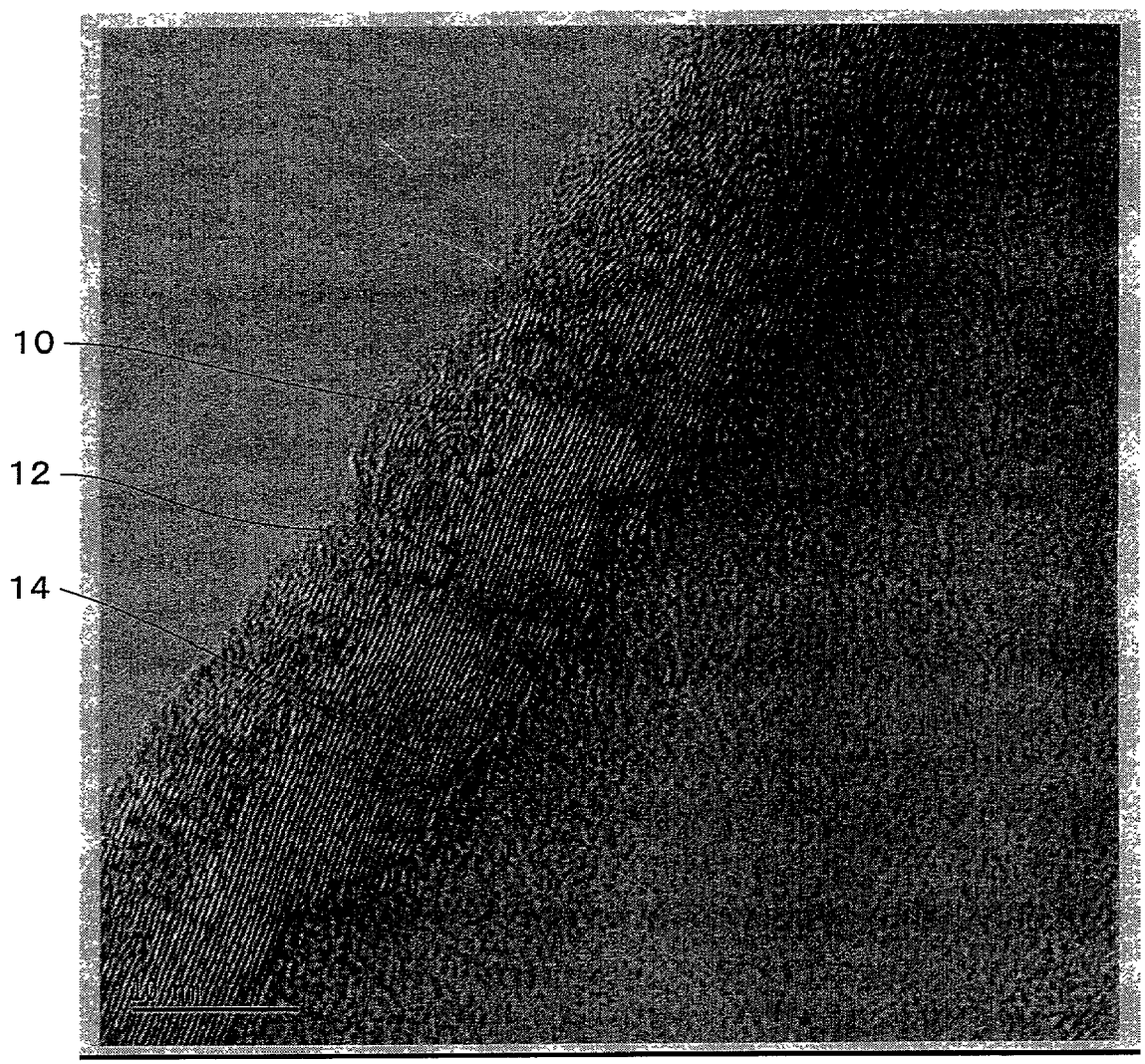
FIG. 1 is a copy of a transmission electron micrograph of a carbon fiber having a herring-bone structure manufactured using a vapor growth process.
Figure 2:
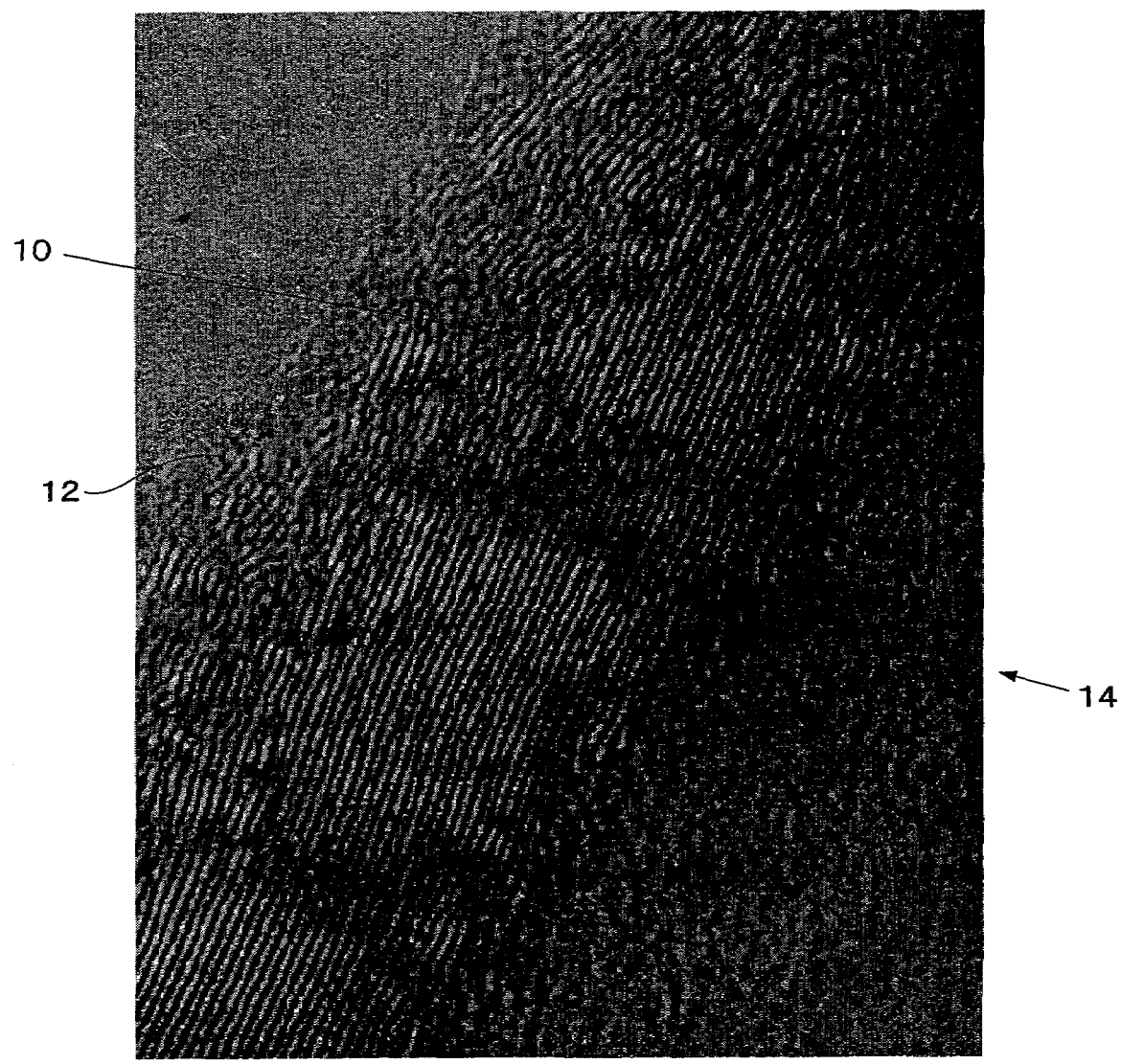
FIG. 2 is a copy of an enlarged photograph of FIG. 1.
Figure 3:
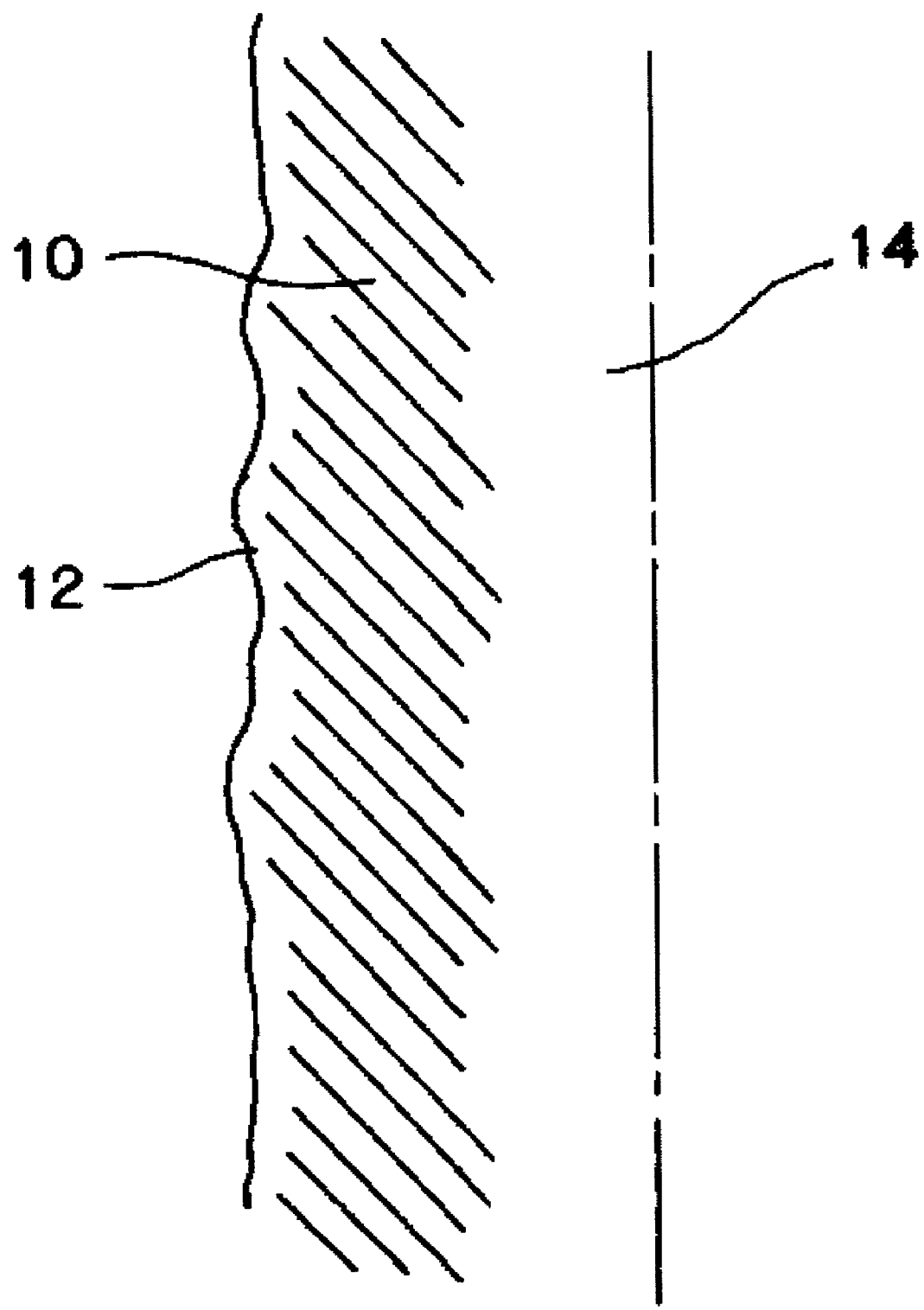
FIG. 3 is a schematic view of FIG. 2.

FIG. 1 is a copy of a transmission electron micrograph of the carbon fiber having a herring-bone structure manufactured using the vapor growth process. FIG. 2 is a copy of an enlarged photograph of FIG. 1, and FIG. 3 is a schematic view of FIG. 2.

As is clear from these figures, a deposited layer 12, in which an excess amount of amorphous carbon is deposited, is formed to cover the tilted hexagonal carbon layers 10. A reference numeral 14 indicates the center hole.

Figure 26:
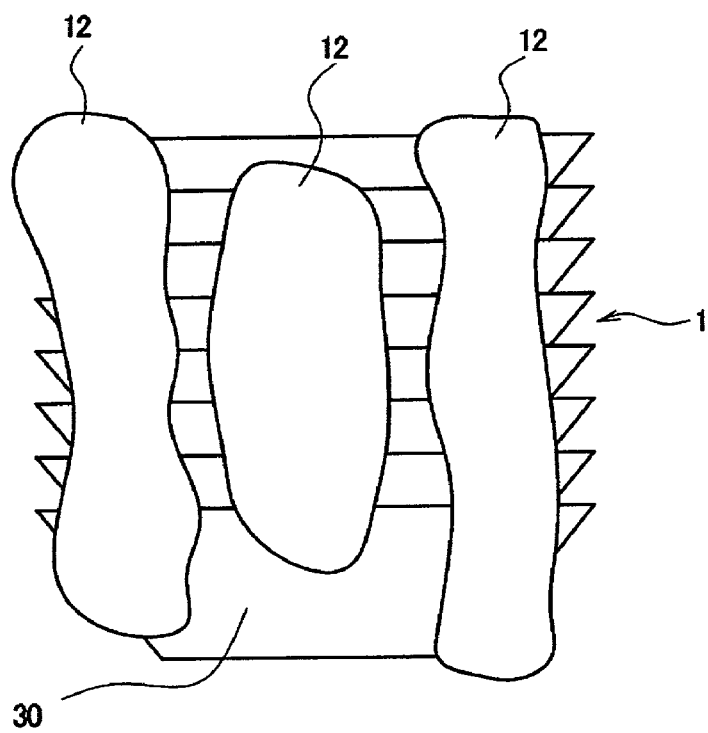
FIG. 26 is a schematic view showing a deposited film of pyrolytic carbon formed over a wide range of an outer surface of a carbon fiber.

FIG. 26 is a view schematically showing a state in which the deposited films 12 are formed over a wide area of the outer surface 30 of the carbon fiber 1. As shown in FIG. 26, the hexagonal carbon layers 10 are exposed on the large ring ends 20 in the areas in which the outer surface of the carbon fiber 1 is not covered with the deposited films 12. These areas have a high degree of activity. In the area in which the inner surface of the carbon fiber 1 is not covered with the deposited films 12, the hexagonal carbon layers 10 are exposed on the exposed small ring ends 22.

The deposited layers 12 are oxidized and pyrolyzed by heating the carbon fiber on which the deposited layers 12 are formed at a temperature of 400° C. or more, preferably 500° C. or more, and still more preferably 520 to 530° C. for one to several hours in air. As a result, the deposited layers 12 are removed, whereby the edges of the hexagonal carbon layers are further exposed.

The deposited layers 12 may be removed by washing the carbon fiber with supercritical water, whereby the edges of the hexagonal carbon layers are exposed.

The deposited layers 12 may be removed by immersing the carbon fiber in hydrochloric acid or sulfuric acid and heating the carbon fiber at about 80° C. while stirring using a stirrer.

Figure 4:
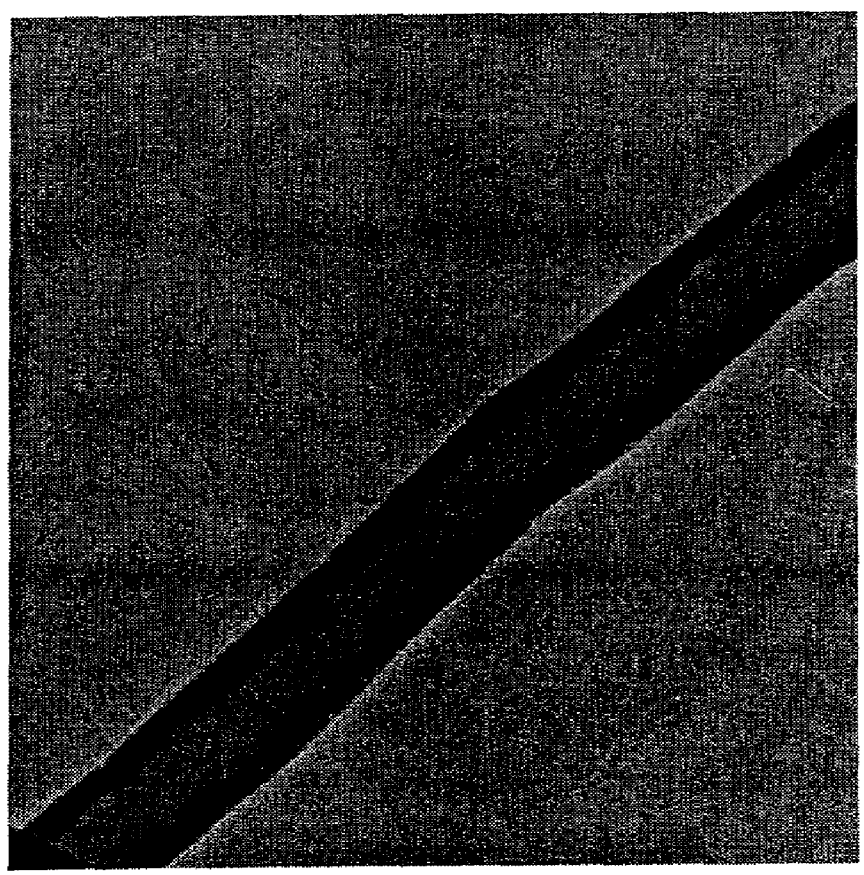
FIG. 4 is a copy of a transmission electron micrograph of a carbon fiber having a herring-bone structure heated at a temperature of about 530° C. for one hour in air.
Figure 5:
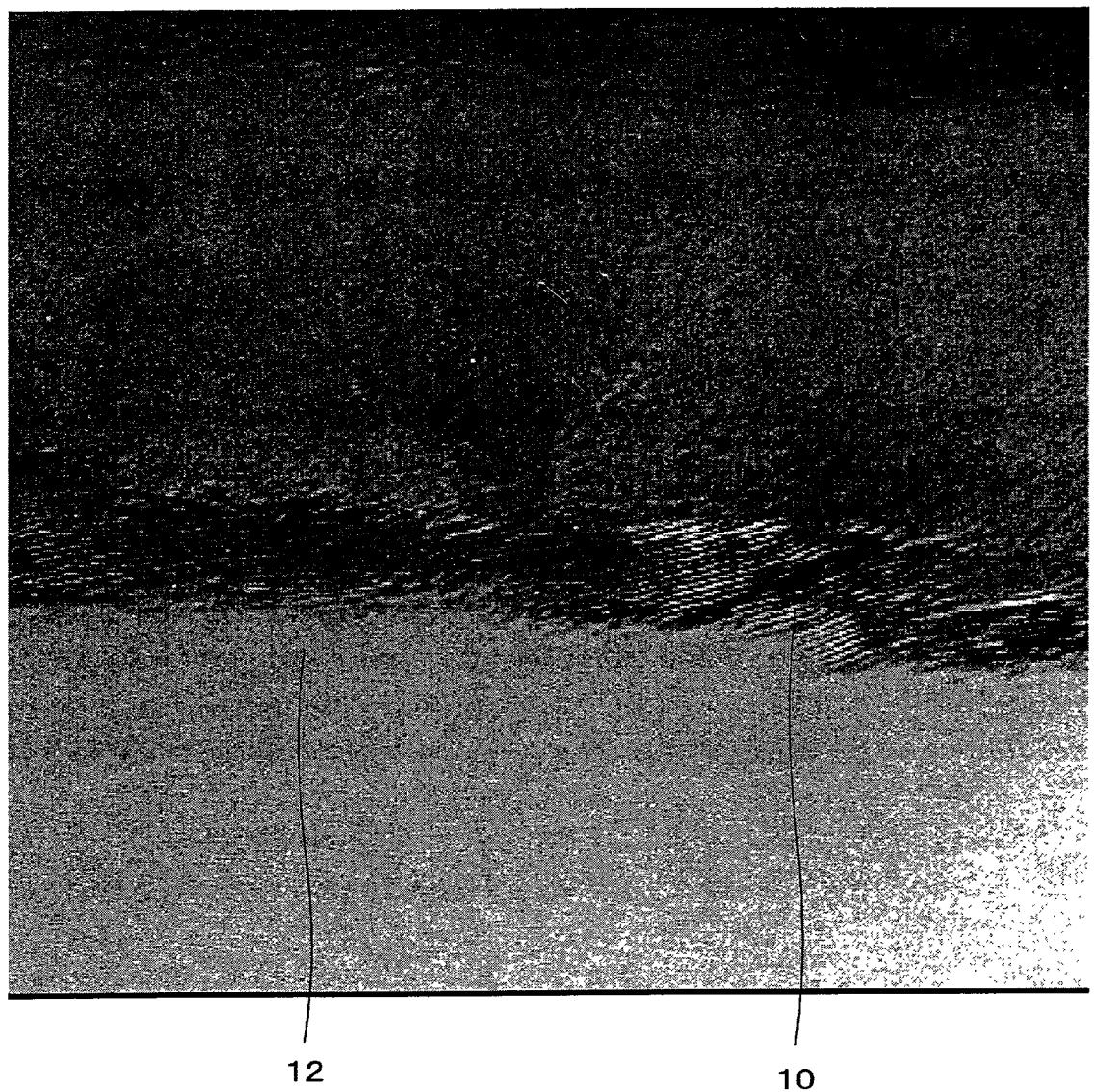
FIG. 5 is a copy of an enlarged photograph of FIG. 4.

FIG. 4 is a copy of a transmission electron micrograph of the carbon fiber having a herring-bone structure heated at a temperature of about 530° C. for one hour in air. FIG. 5 is a copy of an enlarged photograph of FIG. 4, FIG. 6 is a copy of an enlarged photograph of FIG. 5, and FIG. 7 is a schematic view of FIG. 6.

Figure 6:
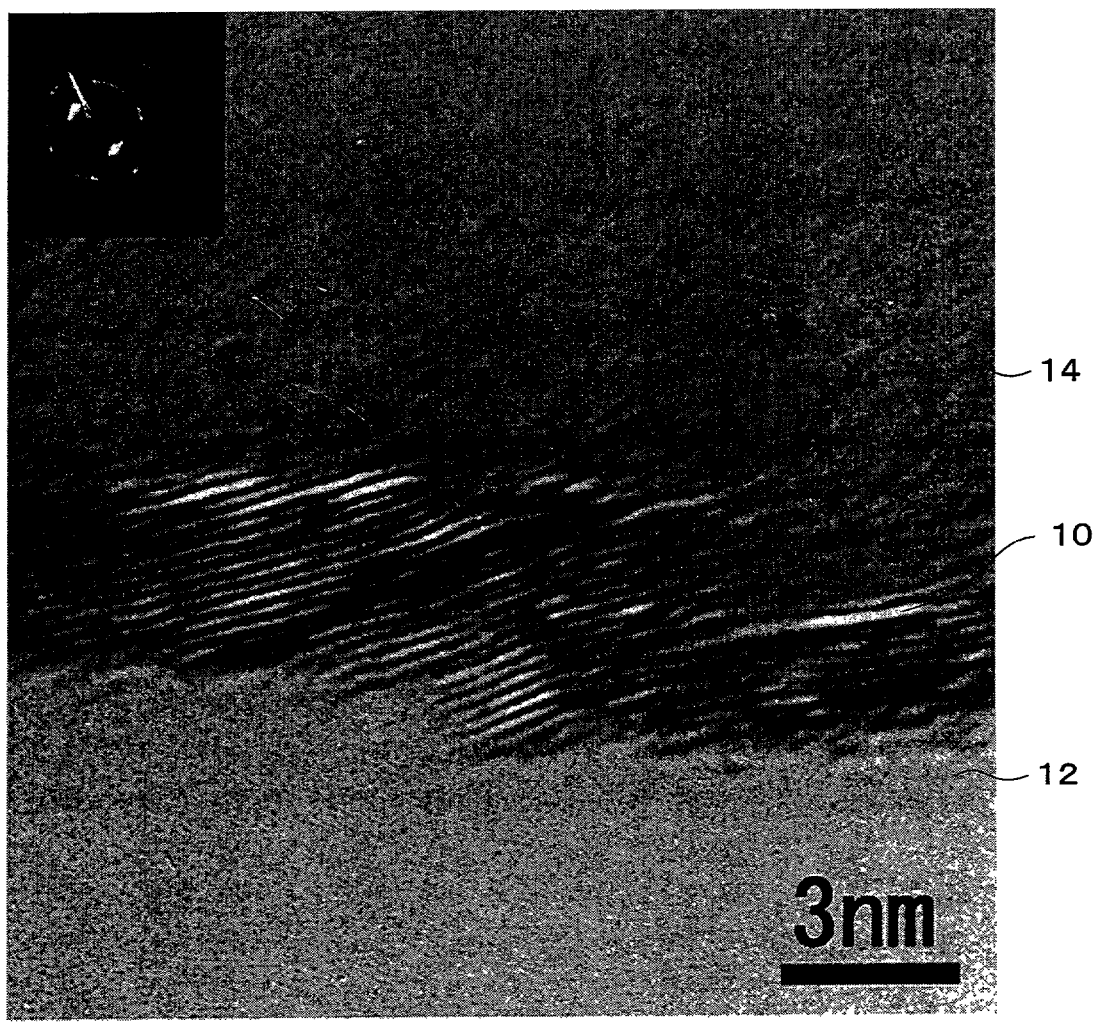
FIG. 6 is a copy of a further enlarged photograph of FIG. 5.
Figure 7:
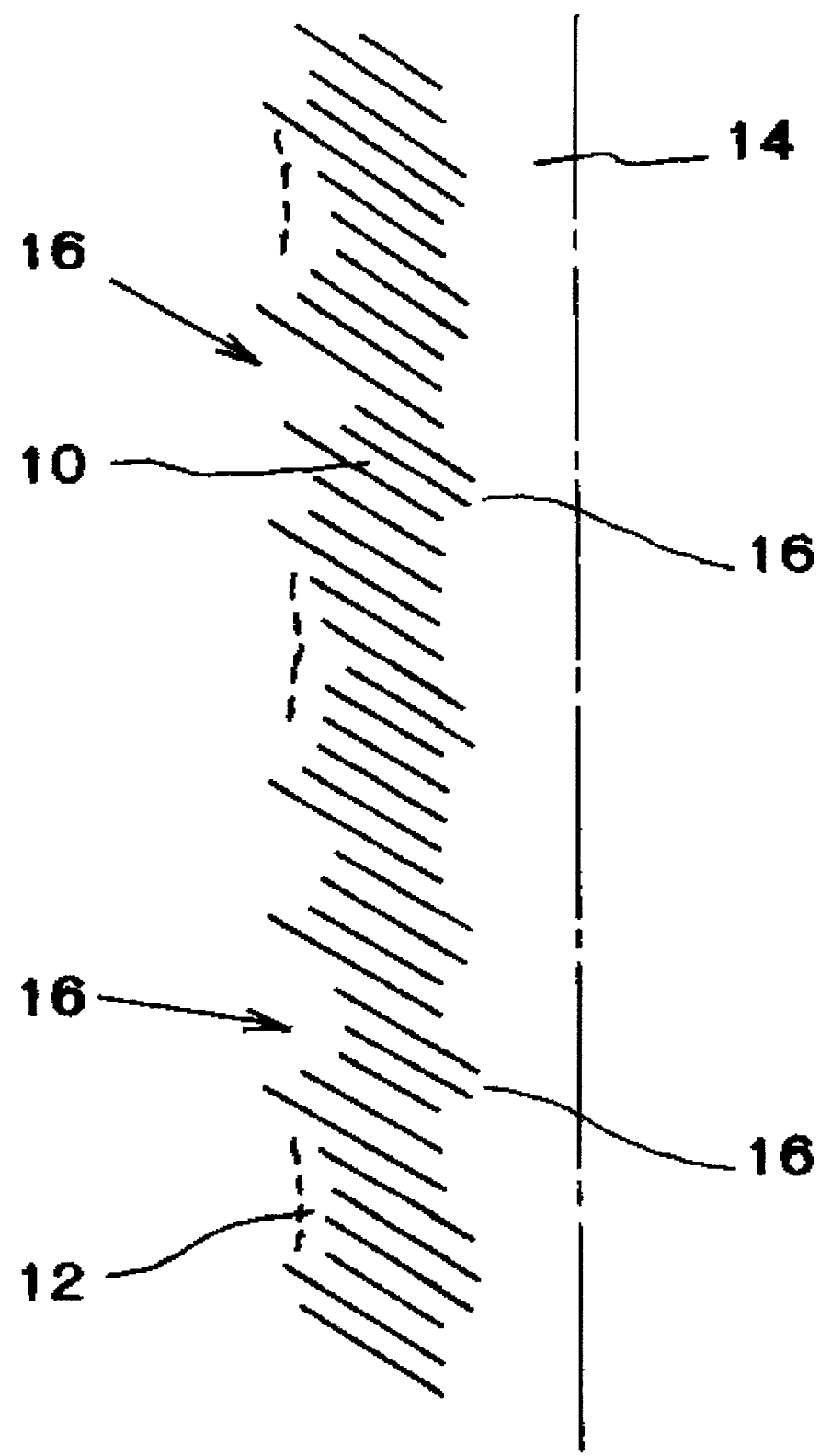
FIG. 7 is a schematic view of FIG. 6.

As is clear from FIGS. 5 to 7, part of the deposited layers 12 is removed by performing a heat treatment or the like, whereby the edges of the hexagonal carbon layers 10 are further exposed. The residual deposited layers 12 are considered to be almost pyrolyzed and merely attached to the carbon fiber. The deposited layers 12 can be removed completely by combining heat treatment for several hours and washing with supercritical water.

As is clear from FIG. 4, the carbon fiber 1 in which a number of hexagonal carbon layers 10 in the shape of a bottomless cup are stacked is hollow at a length ranging at least from several tens of nanometers to several tens of microns.

The tilt angle of the hexagonal carbon layers with respect to the center line is from about 25° to 35°.

As is clear from FIGS. 6 and 7, the edges of the hexagonal carbon layers 10 on the outer surface and the inner surface are irregular in the area in which the edges of the hexagonal carbon layers 10 are exposed, whereby minute irregularities 16 at a nanometer (nm) level, specifically, at the level of atoms are formed. The irregularities 16 are unclear before removing the deposited layers 12 as shown in FIG. 2. However, the irregularities 16 appear by removing the deposited layers 12 by the heat treatment.

The exposed edges of the hexagonal carbon layers 10 have an extremely high degree of activity and easily bond to other atoms. The reasons therefor are considered to be as follows. The heat treatment in air causes the deposited layers 12 to be removed and the amount of functional groups containing oxygen such as a phenolic hydroxyl group, carboxyl group, quinone type carbonyl group, and lactone group to be increased on the exposed edges of the hexagonal carbon layers 10. These functional groups containing oxygen have high hydrophilicity and high affinity to various types of substances.

In addition, the hollow structure and the irregularities 16 contribute to the anchor effect to a large extent.

Figure 8:
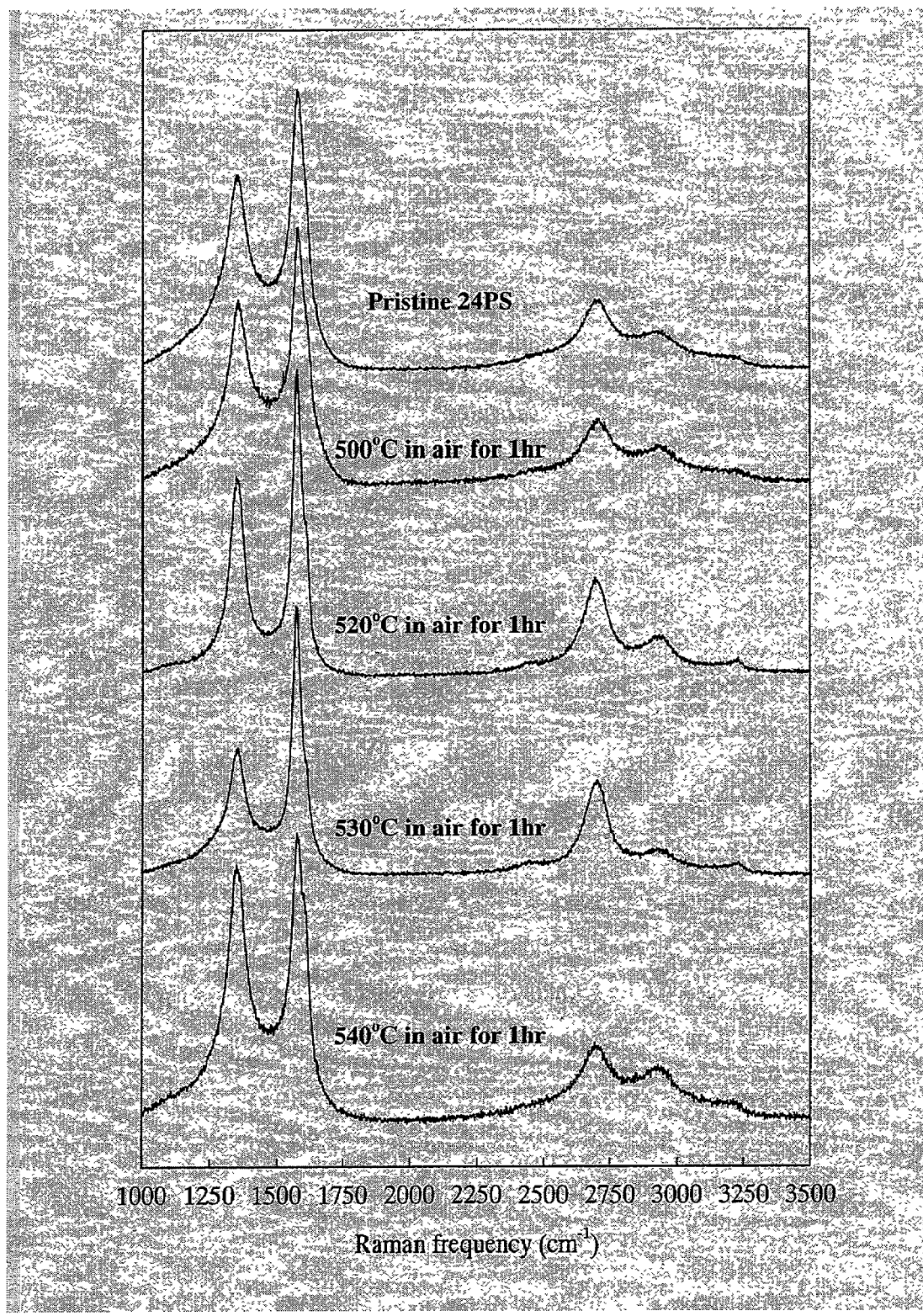
FIG. 8 is a characteristic chart showing the Raman spectra of a carbon fiber having a herring-bone structure (sample No. 24PS) after heating at 500° C., 520° C., 530° C., and 540° C. for one hour in air.

FIG. 8 shows the Raman spectra of a carbon fiber having a herring-bone structure (sample No. 24PS) after heating at 500° C., 520° C., 530° C., and 540° C. for one hour in air.

FIGS. 5 to 7 show that the deposited layers 12 are removed by the heat treatment. As is clear from the Raman spectra shown in FIG. 8, the presence of the D peak (1360 cm$^{-1}$) and the G peak (1580 cm$^{-1}$) shows that this sample is a carbon fiber and has no graphitized structure.

Specifically, the carbon fiber having a herring-bone structure is considered to have a turbostratic structure in which the carbon layers are disordered.

This carbon fiber has a turbostratic structure in which the hexagonal carbon layers are stacked in parallel but are shifted in the horizontal direction or rotated. Therefore, the carbon fiber has no crystallographic regularity.

The feature of this turbostratic structure is that intercalation of other atoms or the like seldom occurs. This is one of the advantages. Specifically, atoms or the like are easily supported on the exposed edges of the hexagonal carbon layers having a high degree of activity, since the substances are scarcely intercalated. Therefore, the carbon fiber is expected to function as an efficient support.

Figure 9:
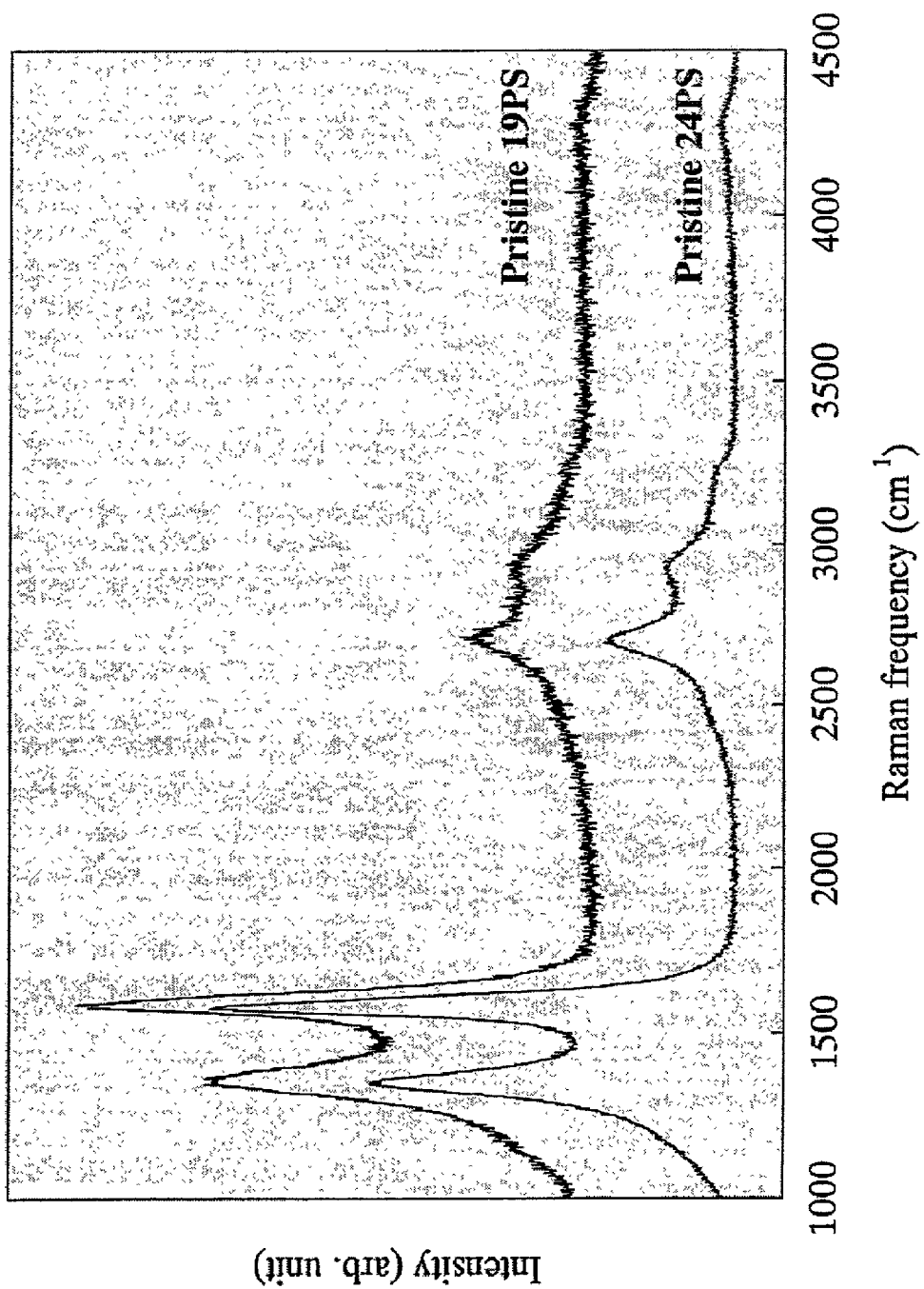
FIG. 9 is a characteristic chart showing the Raman spectra of carbon fiber samples No. 19PS and No. 24PS in which edges of hexagonal carbon layers are exposed by the heat treatment.

FIG. 9 shows the Raman spectra of carbon fiber samples No. 19PS and No. 24PS in which the edges of the hexagonal carbon layers are exposed by the above heat treatment.

Figure 10:
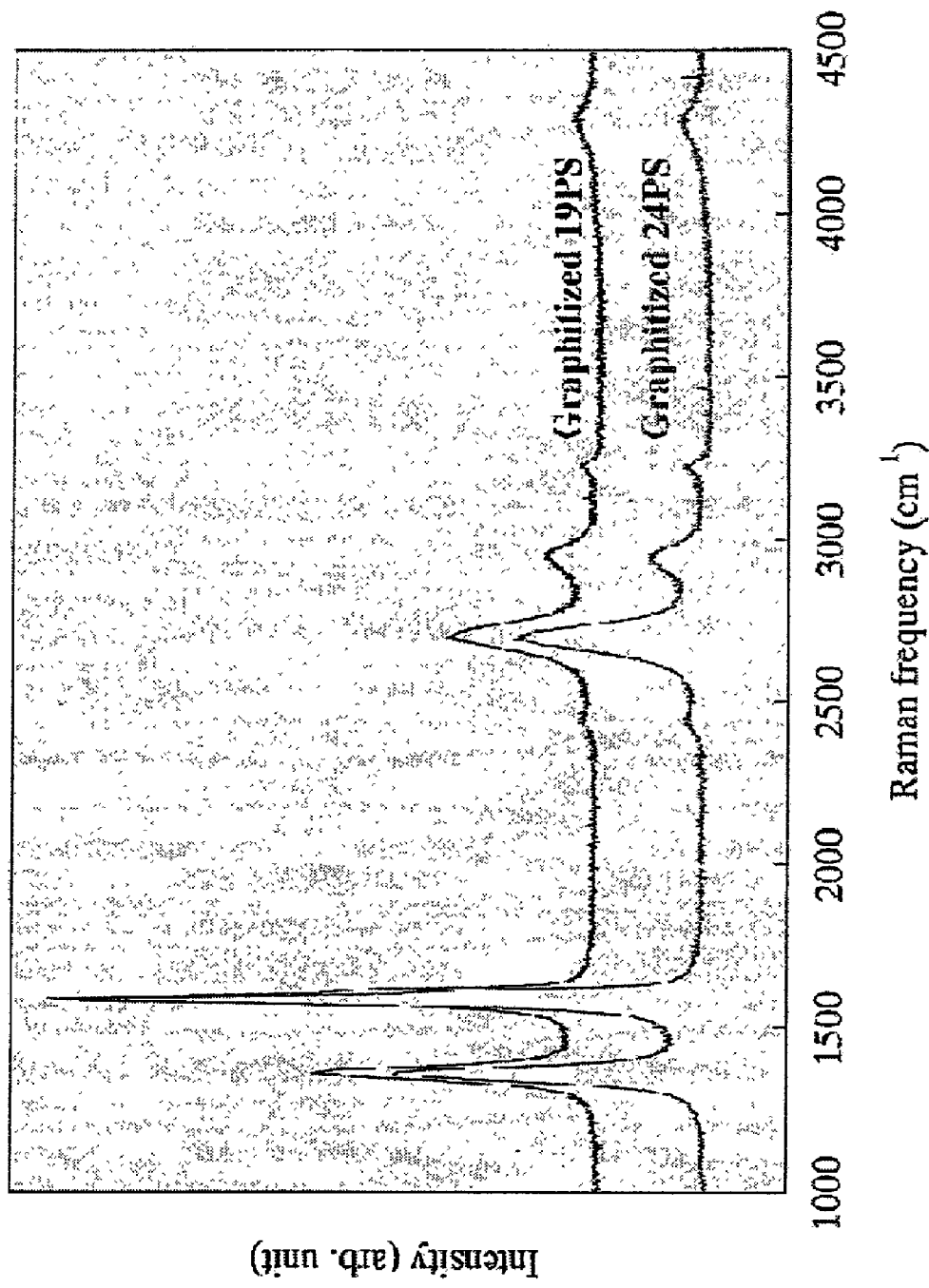
FIG. 10 is a characteristic chart showing the Raman spectra of the carbon fiber samples No. 19PS and No. 24PS heated at 3000° C. after the edges of the hexagonal carbon layers have been exposed.

FIG. 10 shows the Raman spectra of the carbon fiber samples No. 19PS and No. 24PS heated at 3000° C. (common graphitization treatment) after the edges of the hexagonal carbon layers have been exposed.

As shown in FIG. 10, the D peak does not disappear even if the carbon fiber in which the edges of the hexagonal carbon layers are exposed is subjected to the graphitization treatment. This means that the carbon fiber is not graphitized by the graphitization treatment.

A diffraction line did not appear at the 112 plane in X-ray diffractometry (not shown). This also shows that the carbon fiber was not graphitized.

It is considered that the carbon fiber is not graphitized by the graphitization treatment because the deposited layers 12, which are easily graphitized, have been removed. This also shows that the remaining portions of the herring-bone structure are not graphitized.

The fact that the carbon fiber is not graphitized at a high temperature means that the carbon fiber is thermally stable.

The carbon fiber having the herring-bone structure thus obtained is a short fiber (with a length of several tens of microns) in which several tens of thousands to several hundreds of thousands of bottomless cup-shaped or truncated conical tubular hexagonal carbon layers are stacked. This short carbon fiber has a high molecular weight (length) and is insoluble.

A carbon fiber according to one embodiment of the present invention can be obtained by dividing the above short carbon fiber into pieces each of which includes one to several hundreds of stacked hexagonal carbon layers. The carbon fiber becomes soluble if the molecular weight is reduced by decreasing the number of stacked layers, in particular, if the number of hexagonal carbon layers is one.

The short carbon fiber may be divided by adding an appropriate amount of water or solvent and grinding the short carbon fiber softly using a mortar and pestle.

Specifically, the short carbon fiber (in which the deposited layers 12 maybe formed, or part or all of the deposited layers 12 may be removed) is placed in a mortar, and ground mechanically and softly with a pestle.

The carbon fiber having one to several hundreds of stacked hexagonal carbon layers can be obtained by experimentally regulating the treatment time in a mortar.

Since the cyclic hexagonal carbon layers have a comparatively high strength and are bonded to one another only by a weak Van der Waals force, the cyclic hexagonal carbon layers are separated at the gaps at which the bond is weak, without being crushed.

It is preferable to grind the short carbon fiber with a mortar and pestle in liquid nitrogen. Water in air is absorbed when liquid nitrogen is evaporated and becomes ice. By grinding the short carbon fiber together with the ice, the mechanical stress is reduced and the short carbon fiber can be separated at the gaps between the hexagonal carbon layers.

The carbon fiber may be ground by ball milling on an industrial scale.

An example in which the length of the carbon fiber was adjusted by ball milling is described below.

A ball mill manufactured by Kabushikigaisha Asahi Rika Seisakujo was used.

Balls used were made of alumina with a diameter of 5 mm. 1 g of the above carbon fiber, 200 g of alumina balls, and 50 cc of distilled water were placed in a cell, and treated at a rotational speed of 350 rpm. The carbon fiber was sampled when 1, 3, 5, 10, and 24 hours had elapsed.

Figure 11:
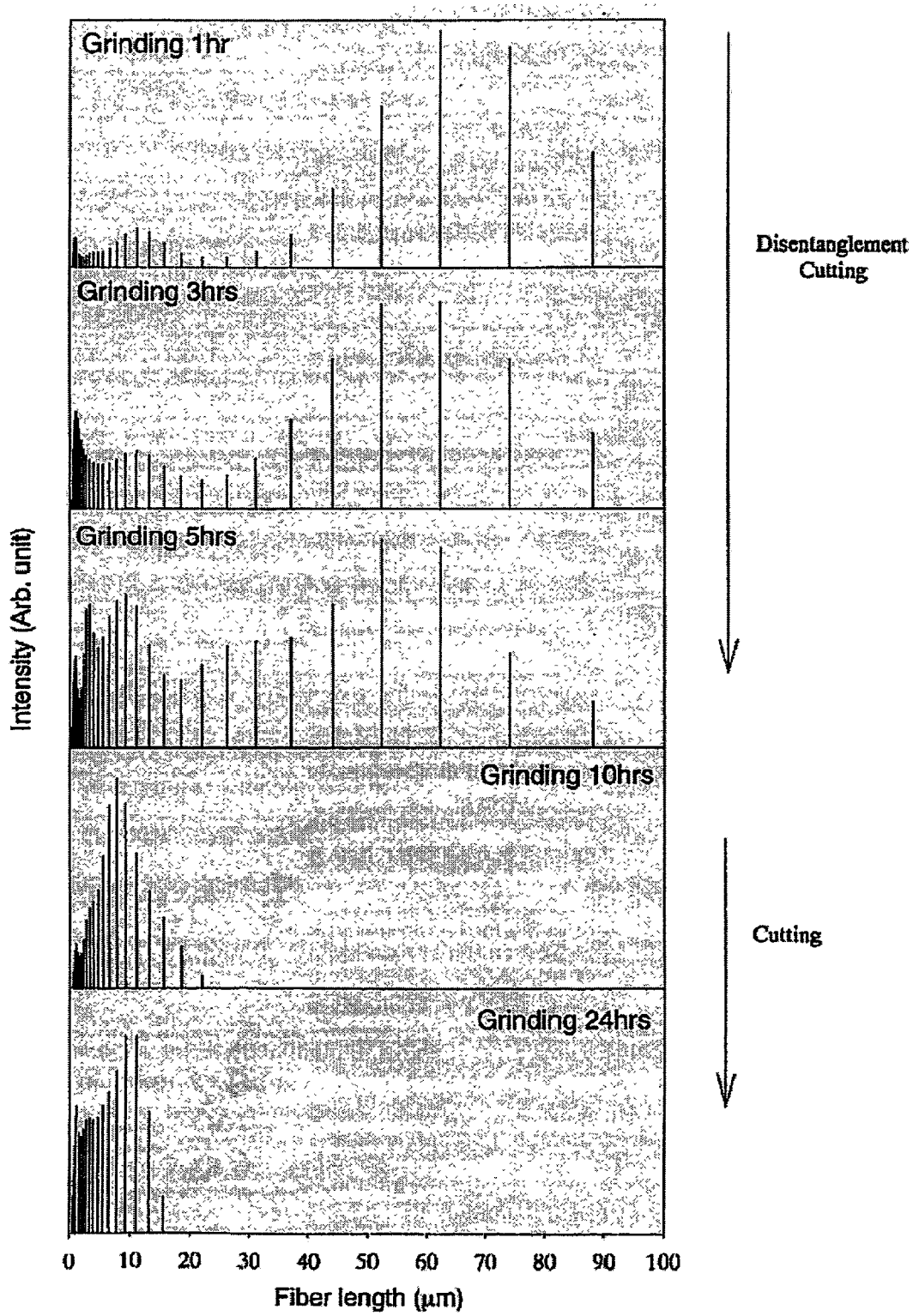
FIG. 11 is a graph showing distributions of the length of the carbon fiber ground by the ball milling with the passage of time.

FIG. 11 shows distributions of the length of the carbon fiber measured using a laser particle size distribution analyzer at each sampling time.

As is clear from FIG. 11, the fiber length is decreased with the passing of milling time. In particular, the fiber length is decreased rapidly to 10 $\mu$m or less after 10 hours have elapsed. Another peak appears at about 1 $\mu$m after 24 hours have elapsed. This clearly shows that the fiber length was further decreased. The reason why the peak appears at about 1 $\mu$m is considered to be because the length almost equals the diameter, whereby the diameter is counted as the length.

This is clear from copies of electron micrographs shown in FIGS. 12 to 16.

Figure 12A:
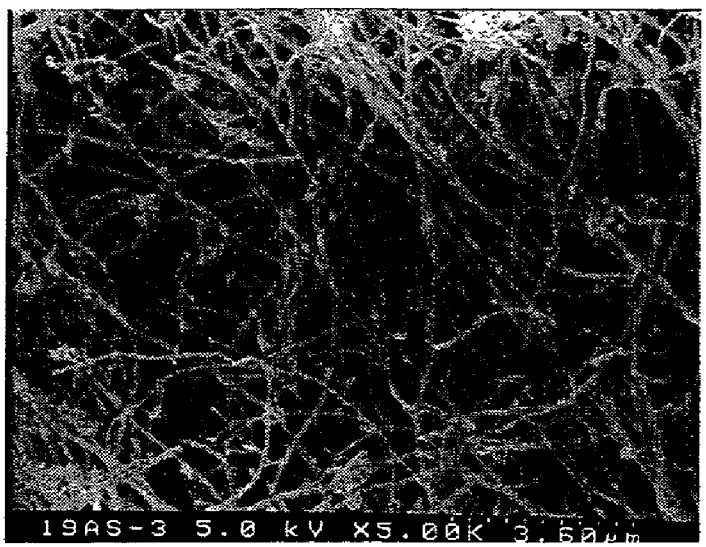
FIG. 12A is a copy of a transmission electron micrograph of the carbon fiber before ball milling and FIG. 12B is a copy of an enlarged micrograph of FIG. 12A.
Figure 12B:
Figure 13A:
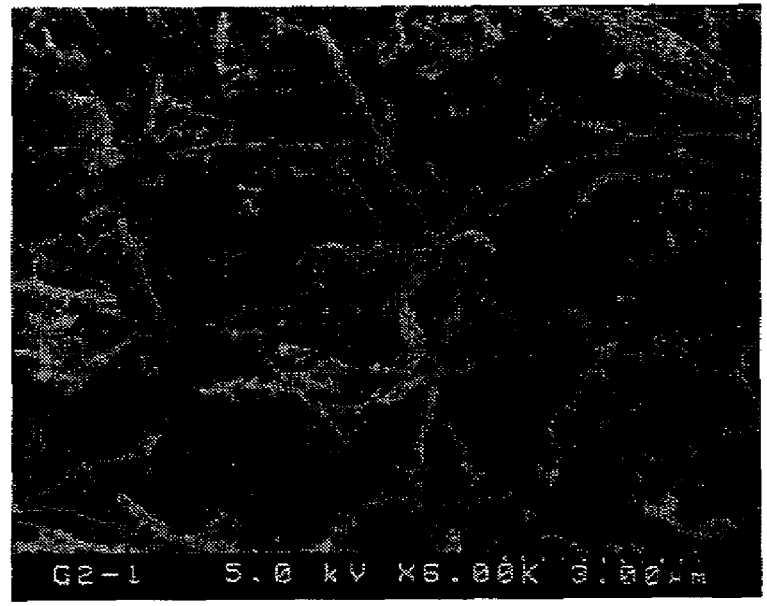
FIG. 13A is a copy of a transmission electron micrograph of the carbon fiber two hours after starting ball milling and FIG. 13B is a copy of an enlarged micrograph of FIG. 13A.
Figure 13B:
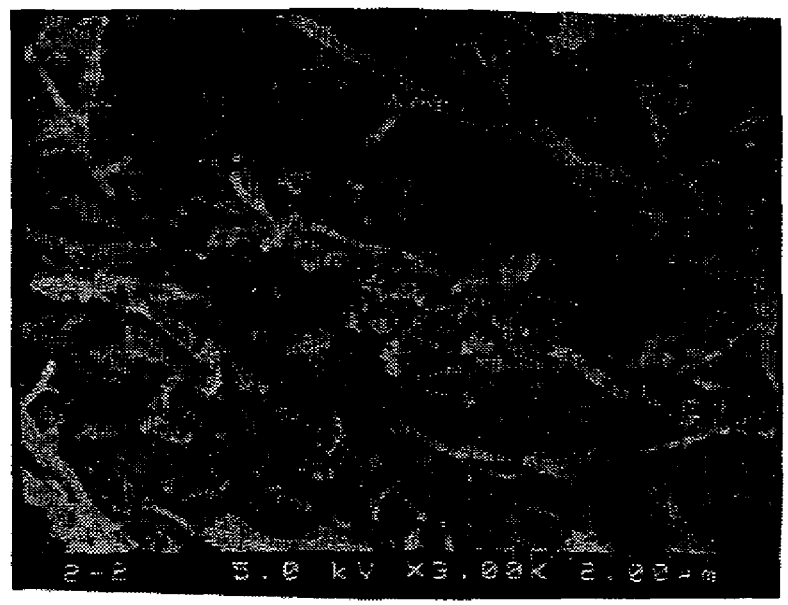
Figure 14A:
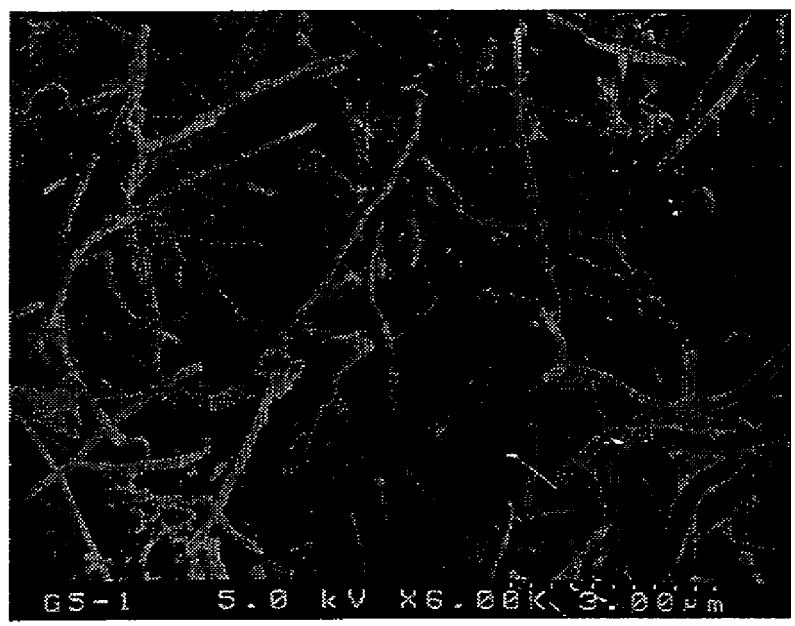
FIG. 14A is a copy of a transmission electron micrograph of the carbon fiber five hours after starting ball milling and FIG. 14B is a copy of an enlarged micrograph of FIG. 14A.
Figure 14B:
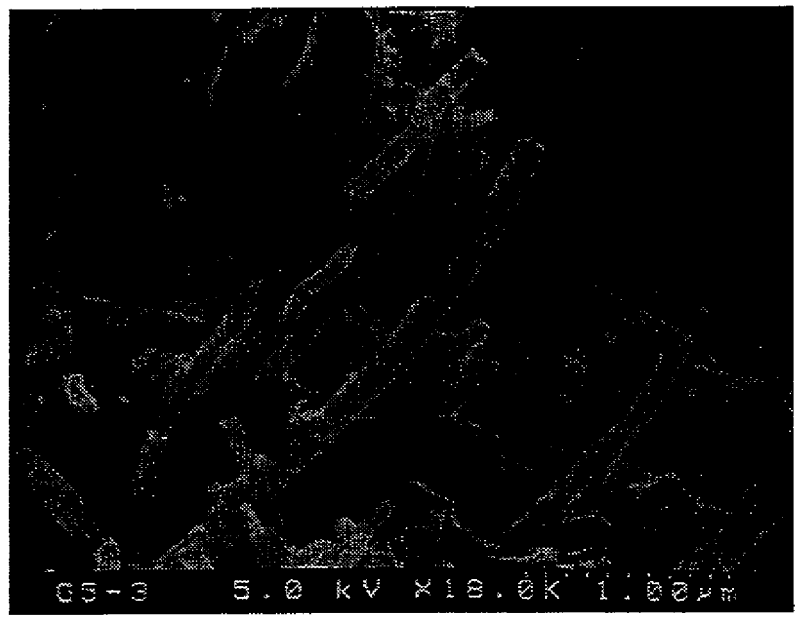
Figure 15A:
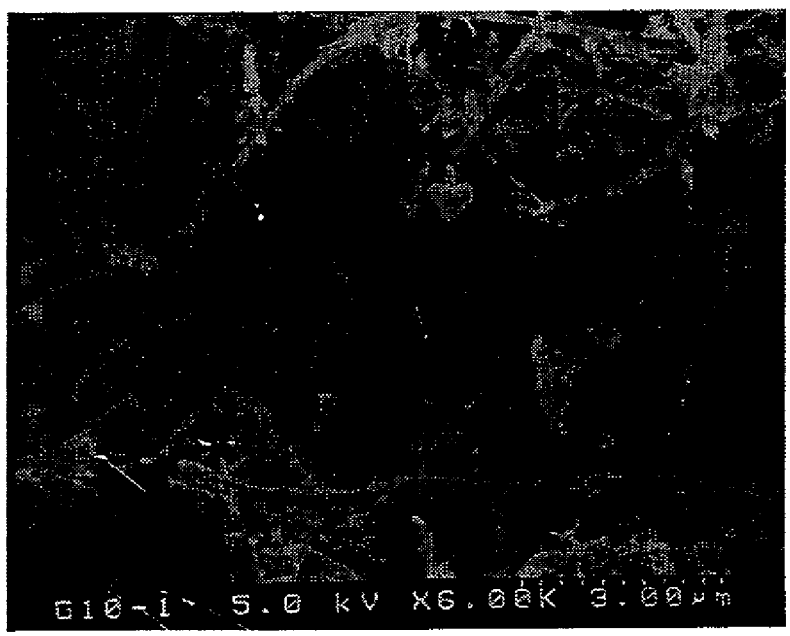
FIG. 15A is a copy of a transmission electron micrograph of the carbon fiber 10 hours after starting ball milling and FIG. 15B is a copy of an enlarged micrograph of FIG. 15A.
Figure 15B:
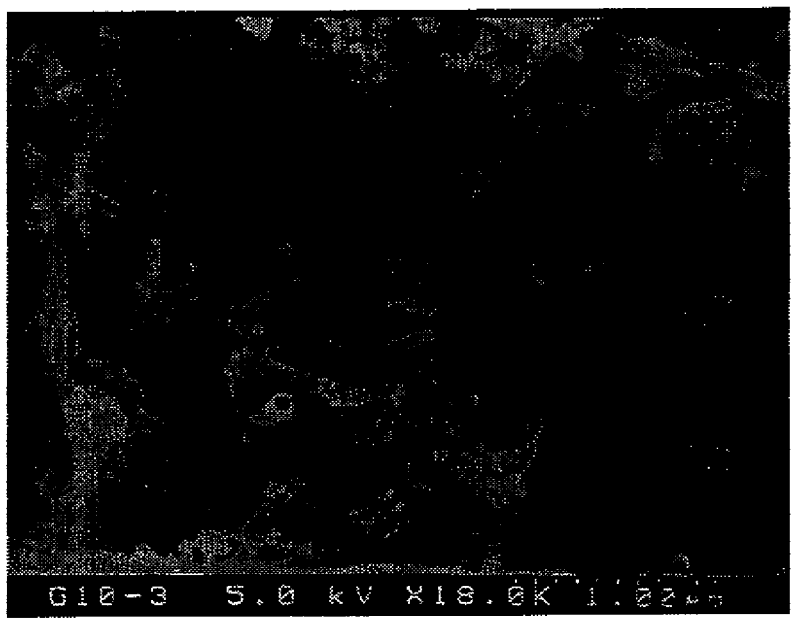

FIG. 12A and FIG. 12B shows the carbon fibers before milling. The carbon fibers with a length of several tens of microns get entangled, whereby the bulk density is extremely low.

Figure 16A:
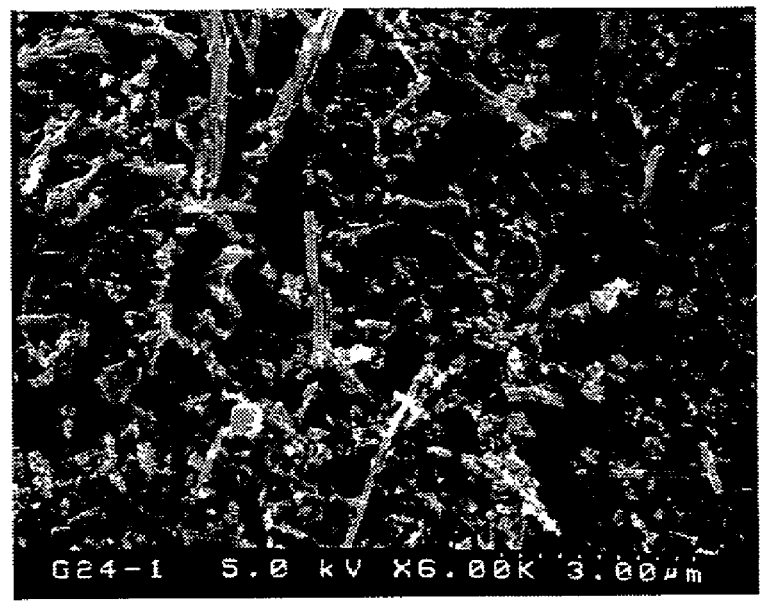
FIG. 16A is a copy of a transmission electron micrograph of the carbon fiber 24 hours after starting ball milling and FIG. 16B is a copy of an enlarged micrograph of FIG. 16A.
Figure 16B:
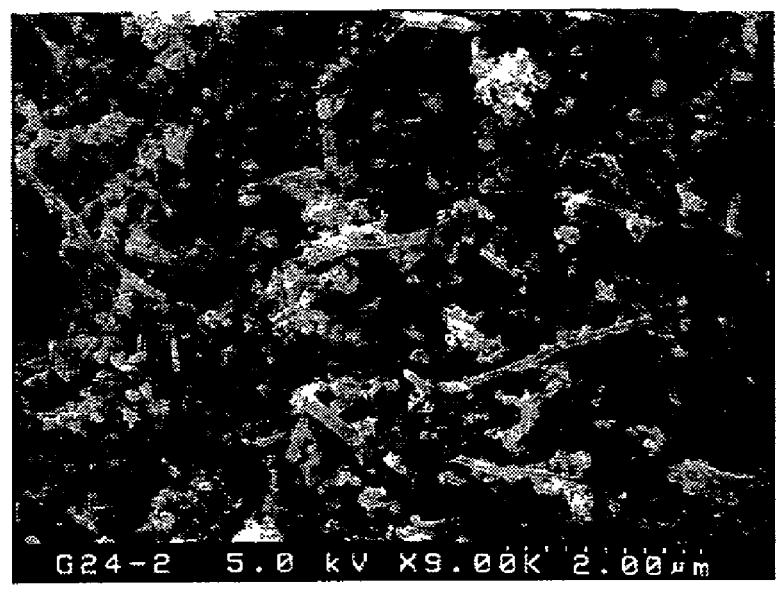

The fiber length is decreased with the passing of milling time from two hours (FIG. 13A, FIG. 13B) to five hours (FIG. 14A, FIG. 14B), 10 hours (FIG. 15A, FIG. 15B), and 24 hours (FIG. 16A, FIG. 16B). After 24 hours, the carbon fibers become almost particle-shaped, whereby entanglement of the fibers is rarely observed. As a result, the bulk density is increased.

Figure 17:
FIG. 17 is a copy of a transmission electron micrograph showing a state in which the hexagonal carbon layer in the shape of a cup starts to separate during the ball milling.
Figure 18:
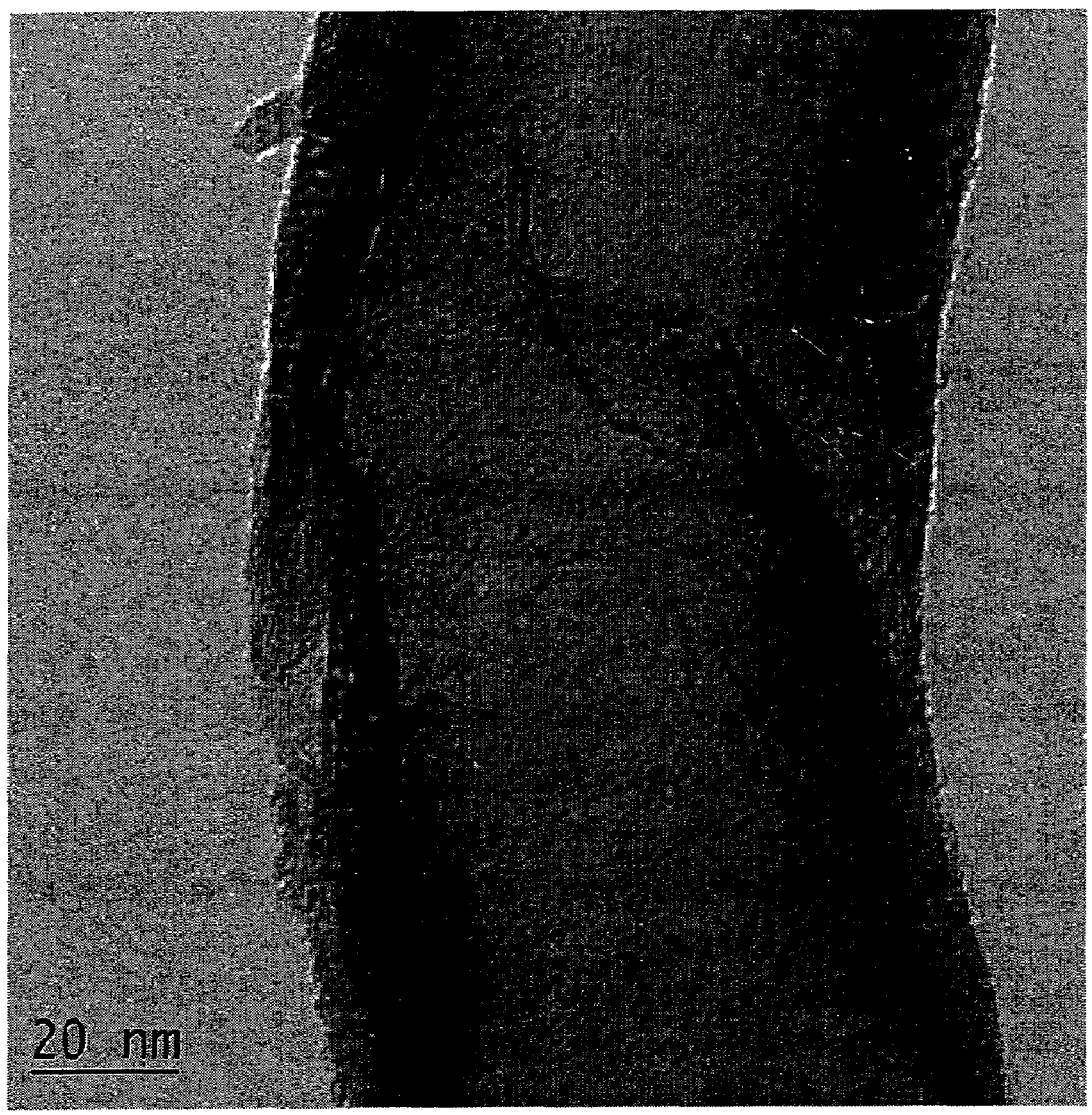
FIG. 18 is a copy of an enlarged photograph of FIG. 17.
Figure 19:
FIG. 19 is a copy of a further enlarged photograph of FIG. 18.

FIGS. 17 to 19 are copies of transmission electron micrographs showing a state in which the carbon fiber is about to be divided during milling. FIGS. 18 and 19 are enlarged views of FIG. 17.

As is clear from these figures, the carbon fiber is not divided by breakage of the fiber, but as a result of separation of the bottomless cup-shaped hexagonal carbon layers.

Figure 20:
FIG. 20 is a copy of a transmission electron micrograph showing a state in which the carbon fiber is divided into carbon fibers each of which includes several tens of bottomless cup-shaped stacked hexagonal carbon layers.

FIG. 20 is a copy of a transmission electron micrograph of a very interesting carbon fiber in which the length is adjusted in a state in which several tens of bottomless cup-shaped hexagonal carbon layers are stacked as described above. The carbon fiber has a hollow shape with no bridge. The edges of the hexagonal carbon layers are exposed on the outer surface side and the inner surface side of the hollow portion. The length of the carbon fiber may optionally be adjusted by changing the milling conditions.

The carbon fiber shown in FIG. 20 is in the shape of a tube with a length and a diameter of about 60 nm which has a thin wall and a large hollow portion.

The bottomless cup-shaped hexagonal carbon layers are thus divided without crushing the shape of the hexagonal carbon layers.

In the case where a conventional concentric carbon nanotube is ground, various problems such as breakage of the tube causing fine split or cracks in the axial direction on the outer surface, or the crush of a core part may occur. Therefore, it is difficult to adjust the length.

As described above, the exposed edges of the hexagonal carbon layers 10 have an extremely high degree of activity and easily bond to other atoms. The reasons therefor are considered to be as follows. The heat treatment in air causes the deposited layers 12 to be removed, and also causes the number of functional groups containing oxygen such as a phenolic hydroxyl group, carboxyl group, quinone type carbonyl group, and lactone group to be increased on the exposed edges of the hexagonal carbon layers. These functional groups containing oxygen have high hydrophilicity and high affinity to various types of substances.

In addition, the hollow structure and the irregularities 16 contribute to the anchor effect to a large extent.

Figure 21:
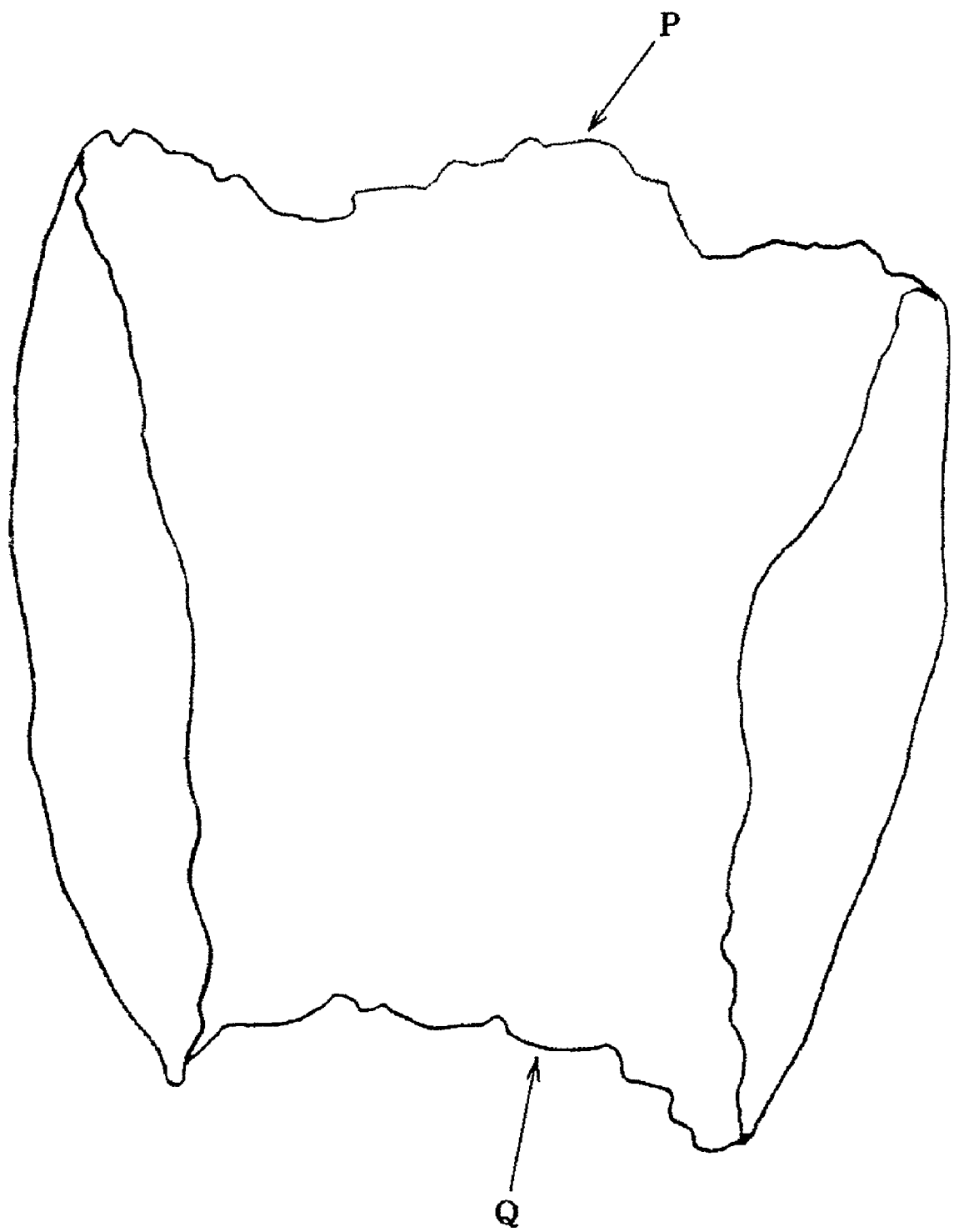
FIG. 21 is a view schematically showing edges of the carbon fiber shown in FIG. 20.
Figure 22:
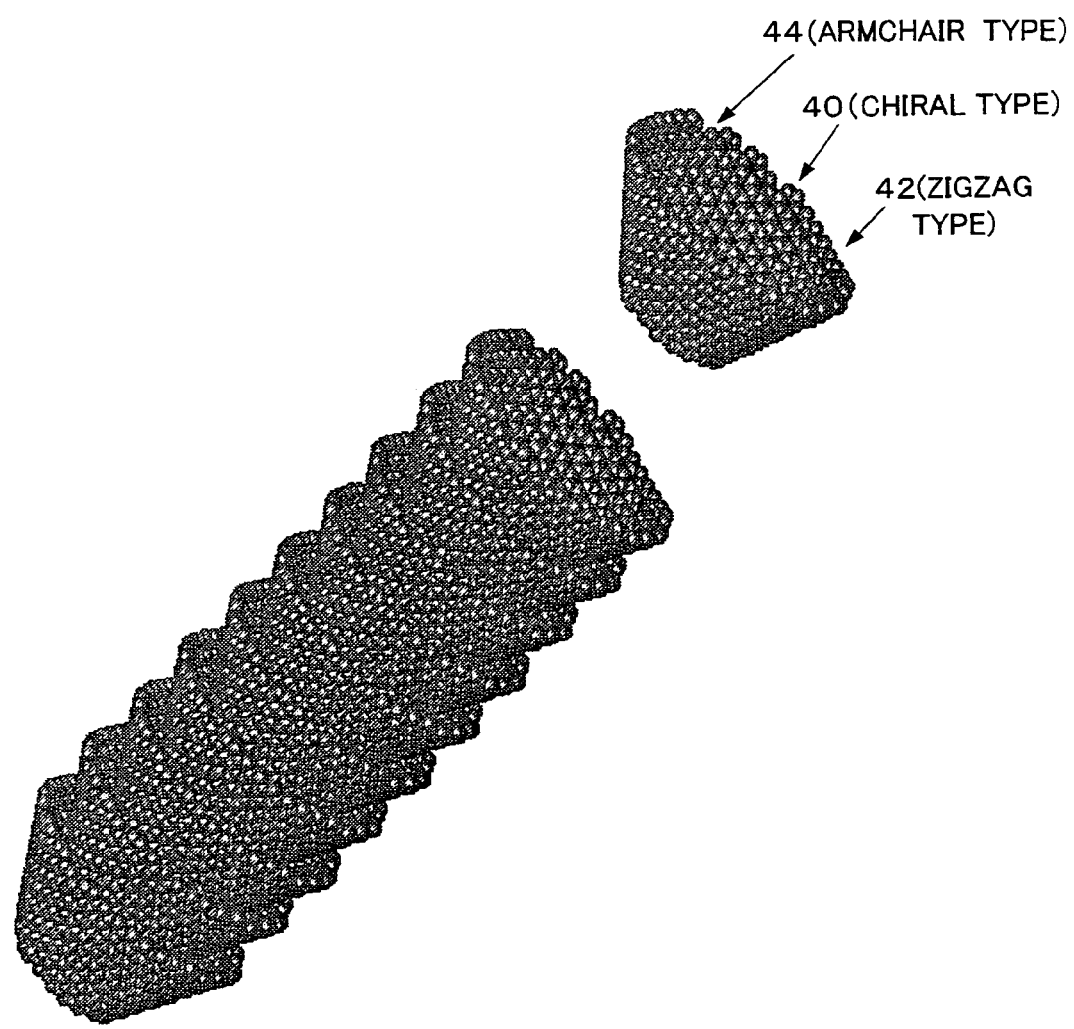
FIG. 22 is a computer graphic of a coaxial stacking morphology of truncated conical tubular graphene layers based on rigorous quantum theoretical calculation.

FIG. 21 is a view schematically showing the edges of the hexagonal carbon layers of the carbon fiber shown in FIG. 20. FIG. 22 is a view showing a state in which the hexagonal carbon layers in the shape of a bottomless cup are stacked. This is quantum mechanically simulated using a computer.

A graphene sheet (equivalent to the hexagonal carbon layer) can be rolled up cylindrically without causing physical stress to occur as in the conventional art.

However, in the case of rolling up the graphene sheet into the shape of a bottomless cup, physical stress occurs, whereby the edges of the hexagonal carbon layers are affected.

Figure 27A:
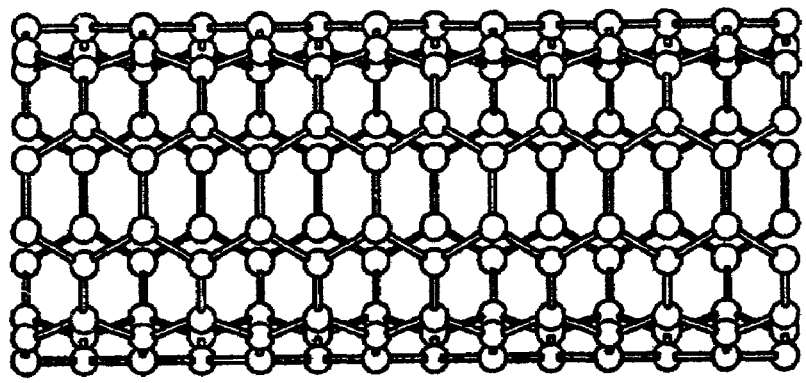
FIGS. 27A to 27C are views respectively showing conventional armchair type, zigzag type, and chiral type tubular hexagonal carbon layers.
Figure 27B:
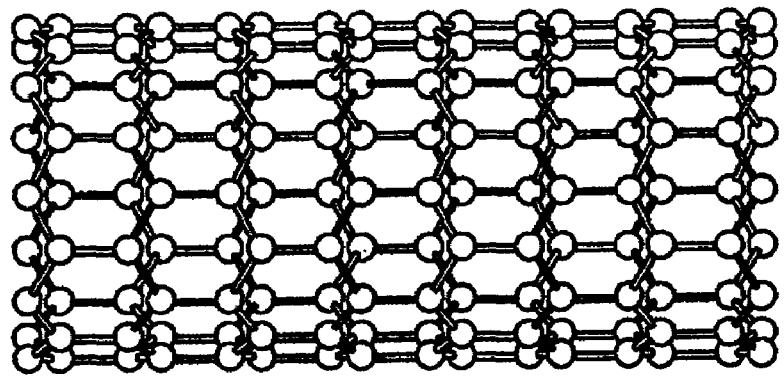
Figure 27C:
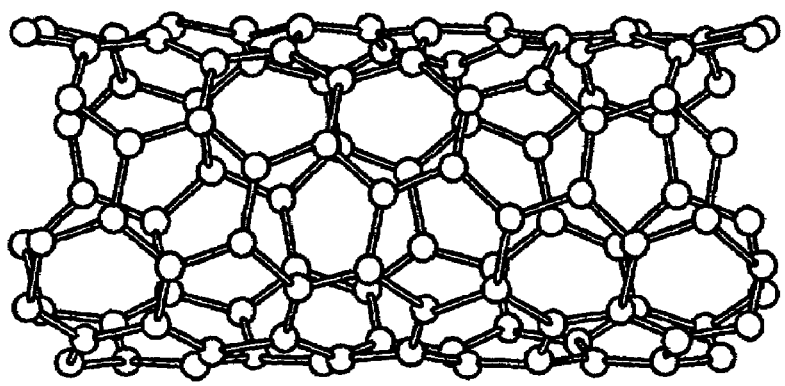

In the case of cylindrically rolling up the graphene sheet, the structure of the graphene sheet is classified into an armchair type (n, n) shown in FIG. 27A, a zigzag type (n, 0) shown in FIG. 27B, and a chiral type (n, m) shown in FIG. 27C (characters and numerals in the parenthesis indicate chiral vector components).

In the case of rolling up the graphene sheet into the shape of a bottomless cup (or a truncated conical tubular configuration), the structure of the graphene sheet is supposed to be similar to the chiral type structure. Actually, as a result of observation of edges P and Q shown in FIG. 21, the cyclic edges of hexagonal carbon layers have the above three types. For example, a chiral edge 40, a zigzag edge 42 and an armchair edge 44 can be observed in FIG. 22.

As described above, irregularities at the level of atoms are formed between the edges of each hexagonal carbon layer. Therefore, different types of structures are present on the large ring end of each hexagonal carbon layer on the circumference. This also applies to the small ring ends on the inner surface side of the carbon fiber.

Such an irregular structure in which these edges are exposed increases the degree of activity of the edges.

Moreover, the carbon fiber has characteristics which differ between the large ring end and the small ring end of each bottomless cup-shaped hexagonal carbon layer due to the difference in diameter.

Since the above carbon fiber has characteristics which differ between the large ring ends and the small ring ends having different diameters, the carbon fiber may be used as a bio chip (DNA chip) to classify different DNAs adsorbed on the opposite ends, for example.

Moreover, since different types of enzymes are selectively adsorbed on either the large ring end or the small ring end depending on the type, the carbon fiber may be used for classification of enzymes.

Furthermore, the carbon fiber is expected to function as a filter for sorting various types of substances by utilizing the different adsorption characteristics of the opposite ends.

As described above, the carbon fiber according to the embodiment of the present invention can be used as various types of filters, absorbents, and the like by utilizing the different characteristics of the large ring ends and the small ring ends.

What is claimed is:

1. A stacked cup carbon nanofiber comprising a coaxial stacking morphology of vapor grown truncated conical tubular graphene layers,
   wherein each of the truncated conical tubular graphene layers includes a hexagonal carbon layer in the shape of a hollow cup not having a bottom, and having a large ring end at one end and a small ring end at the other end in the axial direction;
   wherein at least a part of the hexagonal carbon layers is exposed at the large ring end;
   wherein the exposed large ring end has an armchair edge, a zigzag edge, and a chiral edge on the circumference;
   wherein at least part of edges of the hexagonal carbon layers is exposed at the small ring end;
   wherein the exposed small ring end has an armchair edge, a zigzag edge, and a chiral edge on the circumference;
   wherein at least part of a deposited film formed during the vapor growth is removed from the large ring end and the small ring end; and
   wherein the stacked cup carbon nanofiber has a round cross-section.

2. The stacked cup carbon nanofiber as defined in claim 1, wherein the coaxial stacking morphology of the truncated conical tubular graphene layers has a shape of a hollow core with no bridge.

3. The stacked cup carbon nanofiber as defined in claim 1, wherein an outer surface of the stacked cup carbon nanofiber is formed of the large ring end stacked in the axial direction; and
   wherein the exposed part of the edges of the hexagonal carbon layers has an area equal to or more than 2 percentages of an area of the outer surface.

4. The stacked cup carbon nanofiber as defined in claim 3, wherein a position of the large ring end forming the outer surface is irregular, and the outer surface has minute irregularity at the level of atoms.

5. The stacked cup carbon nanofiber as defined in claim 1, wherein an inner surface of the stacked cup carbon nanofiber is formed of the small ring end stacked in the axial direction; and
   wherein a position of the small ring end forming the inner surface is irregular, and the inner surface has minute irregularity at the level of atoms.

6. The stacked cup carbon nanofiber as defined in claim 1, wherein heat treatment at a temperature equal to or more than 2500° C. provides no graphitization of the carbon fiber.

7. The stacked cup carbon nanofiber as defined in claim 1, wherein heat treatment at a temperature equal to or more than 2500° C. provides no disappearance of the D peak (1360 $cm^{-1}$) in the Raman spectrum.

8. The stacked cup carbon nanofiber as defined in claim 1, wherein two to several hundreds of the hexagonal carbon layers are stacked.

9. A filter comprising the stacked cup carbon nanofiber as defined in claim 1.

10. An absorbent comprising the stacked cup carbon nanofiber as defined in claim 1.

* * * * *